ary Examiner—Harold D. Anderson
United States Patent [19]
Sianesi et al.

[11] 3,721,638
[45] March 20, 1973

[54] PROCESS FOR THE POLYMERIZATION OF TETRAFLUOROETHYLENE IN AQUEOUS PHASE AND PRODUCTS OBTAINED THEREFROM

[75] Inventors: Dario Sianesi; Giancarlo Bernardi, Canzo; Gianfranco Veroli, all of Milan Italy

[73] Assignee: Montecatini Edison S.p.a., Milan, Italy

[22] Filed: Aug. 6, 1969

[21] Appl. No.: 848,772

[30] Foreign Application Priority Data

Aug. 8, 1968   Italy..............................19948 A/68

[52] U.S. Cl. ......260/29.6 F, 260/29.6 ME, 260/92.1
[51] Int. Cl...............................................C08f 45/24
[58] Field of Search..........260/29.6 F, 29.6 ME, 92.1

[56] References Cited

UNITED STATES PATENTS

| | | |
|---|---|---|
| 2,559,750 | 7/1951 | Berry....................................260/29.6 |
| 2,965,595 | 12/1960 | Brinker et al.........................269/29.6 |
| 3,009,892 | 11/1961 | Duddington et al..................260/29.6 |
| 3,038,870 | 6/1962 | Schott...................................260/29.6 |
| 3,271,341 | 9/1966 | Garrison...............................260/29.6 |
| 3,316,201 | 4/1967 | Hahn et al............................260/29.6 |
| 3,391,099 | 7/1968 | Ponderson...........................260/29.6 |
| 3,432,511 | 3/1969 | Reiling.................................260/92.1 |
| 3,301,807 | 1/1967 | Hoashi..............................260/29.6 F |
| 3,535,301 | 10/1970 | Groppelli et al. ................260/29.6 F |

*Primary Examiner*—Harold D. Anderson
*Attorney*—Hubbell, Cohen & Stiefel

[57] ABSTRACT

Improved high molecular weight tetrafluoroethylene polymers are obtained in the form of hydrophilic aqueous gel or hydrophobic fine powder compatible with organic plasticizing fluids by aqueous phase polymerization at super-atmospheric pressure and temperature between about 0°C and 120°C, in presence of known polymerization initiators and of at least one perfluorinated ether ketone. Hydrophilic gel can be transformed to hydrophobic powder to several alternate techniques. Products are more easily processable than those produced by prior processes, and can be formed into manufactured articles having superior physical and mechanical characteristics.

14 Claims, 1 Drawing Figure

PROCESS FOR THE POLYMERIZATION OF TETRAFLUOROETHYLENE IN AQUEOUS PHASE AND PRODUCTS OBTAINED THEREFROM

BACKGROUND OF THE INVENTION

1. Field of the Invention

The present invention relates to a process for the polymerization of tetrafluoroethylene in aqueous phase, wherein the polymerization is carried out in the presence of a perfluorinated ether ketone compound. As a result of this process and more particularly due to the presence of the ketone compound, the polymer that is formed, at least in the initial state of the polymerization, is hydrophilic and is obtained in the form of an aqueous gel. This invention also relates to the aqueous polymer gel thus obtained as well as the tetrafluoroethylene polymer powder obtainable from said hydrogel by separation of the polymer from the water, which separation may be carried out according to different methods.

2. Description of the Prior Art

Until now the polymerization of tetrafluoroethylene could be carried out in aqueous phase, substantially according to two different processes, by which two distinct types of polymer could be obtained. The two polymerization processes are known in the art as emulsion and suspension polymerization.

The process which is carried out by the emulsion polymerization technique requires the presence, in the aqueous phase, of a suitable emulsifying agent, such as, for instance, perfluorooctanoic acid or its ammonium or alkali metal salts. The dissolved emulsifying agent causes the formation in aqueous phase of micelles which become the sites of polymerization. The reaction produces an aqueous emulsion, of milky appearance, which is homogeneous, filterable, and has a viscosity similar to that of water.

The emulsion contains elementary cells of polymer having a diameter of granule size below 1 micron. Such an emulsion forms a physical system of low stability, and the polymer contained therein may be separated by coagulation of the emulsion by various known methods (e.g., stirring, heating, freezing, addition of electrolytes). The polymer thus obtained (after drying) appears in the form of a powder consisting of agglomerates of the original particles and does not require special post-treatments prior to its use.

However, it is well known that, in general, the tetrafluoroethylene polymers obtainable by the method of emulsion polymerization are characterized by relatively low molecular weights and, therefore, the shaped articles prepared from them do not possess desirable physical and mechanical properties. On the other hand, these polymers display some distinctive characteristics, such as, for instance, a certain compatibility towards organic fluid plasticizers (such as for instance hydrocarbons) in which they can be absorbed partially, thereby yielding mixes capable of being processed and formed with particularly rapid techniques (e.g., extrusion in paste, lubricated extrusion).

The emulsion polymerization takes place in a practically homogeneous medium which allows an effective removal of the heat of reaction and therefore allows good temperature regulation of the polymerization. On the other hand, the process involves the formation of a metastable system, due to the tendency of the emulsion to coagulate, that is, to separate irreversibly the water from the polymer, when subjected to a small variation of temperature and to the actions of even low intensity mechanical energy. This, practically, prevents the execution of the process by a continuous method, and the use of an emulsion stabilizing agent during the polymerization becomes necessary. Moreover, the polymer content of the emulsion that may be directly produced in the reaction, in general, does not exceed rather low values (10—30 percent by weight of polymer). The emulsion polymerization of tetrafluoroethylene is, as a matter of fact, a slow and discontinuous process which affords poor, inefficient utilization of the polymerization catalyst.

The suspension polymerization process is carried out in an aqueous phase in the absence of emulsifying agents or of surface active agents in general. Thus a polymer is obtained consisting of particles not wetted by the water, which gradually increase in size by direct polymerization of the monomer present on the surface of the particles themselves.

In general, at the end of the polymerization, the polymer that is obtained appears in the form of granules of rather large size, usually of the order of a few millimeters in diameter, and of rather irregular shape, with a wide size and shape distribution.

In this process of polymerization, the formation of crusts on the inside walls of the reactor, as well as the formation of compact agglomerates and of rather bulky blocks, is quite frequent. The reacting system is, thus, coarsely heterogeneous and the polymer, which floats on the water, is obtained by decantation and filtering. Such a polymer must, to render it in condition for its practical utilization, be subjected to repeated grinding and grading cycles, in order to obtain polymer powder having an homogeneous granulometry, with particle diameters, on the average, ranging between 30 and 500 microns. In this connection, it must be noted that the procedures to be adopted for such post-treatments of the polymer must be chosen carefully, since certain characteristics of the powders depend on the particular procedure and conditions under which it is performed. In turn, these characteristics determine the properties of the corresponding manufactured articles. More particularly, the polymer is processed according to the well known pre-forming and sintering techniques (Merritt A. Rudner "Fluorocarbons" Reinhold Publ. Co. N.Y. (1958) ), and the manufactured products are therefore affected by such characteristics of the starting powders as the granulometry, the homogeneity of the shape and size of the particles, and their flowability. It must also be remarked that the polymers of tetrafluoroethylene produced by the suspension method do not show any tendency to absorb organic plasticizers and lubricating liquids and thus are not in any way suited for processing procedures of the lubricated extrusion type.

The polymers obtained in suspension do, however, have a rather high molecular weight, and therefore the manufacted articles prepared therefrom possess quite excellent physical and mechanical characteristics.

The suspension polymerization process also has the advantages of simplicity, and of a very high polymerization rate. The drawbacks of the process lie in the difficulty of ensuring god thermal regulation and in its

SUMMARY OF THE INVENTION

The present invention provides a polymerization process which does not present the drawbacks involved in the heretofore discussed already known processes. More particularly, the present invention provides a process which results in polymers of a very high molecular weight having excellent physical and mechanical characteristics and a sufficiently fine and homogeneous granulometry so as to allow their immediate utilization in the manufacture of end products without requiring any additional grinding and grading operation. In addition, the thus produced polymers have excellent compatibility towards plasticizing liquids. Moreover, the process of the present invention takes place with a high polymerization rate in a substantially homogeneous system and is suitable for being carried out continuously.

The present invention also provides a polytetrafluoroethylene in the form of a highly stable aqueous gel. It also provides a polytetrafluoroethylene of high molecular weight in the form of a fine and homogeneous powder.

More particularly, the present invention provides an improvement in a process for the aqueous phase polymerization of tetrafluoroethylene to a high molecular weight polymer at a pressure between 2 and 50 atmospheres and at a temperature between 0°C and 120°C, in the presence of a polymerization initiator for tetrafluoroethylene polymerization, this improvement comprising carrying out the polymerization reaction in the presence of at least one perfluorinated ether ketone of the formula:

$$A - O - (C_3F_6O)_n - CF_2 - CO - CF_3$$

wherein A is selected from the group consisting of $CF_3-$, $CF_3-O-CF_2-$, and

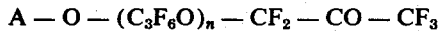

is a perfluoroalkylene group derived from the opening of a double bond of a hexafluoropropylene molecule; and $n$ is 0 or an integer not greater than 5; said perfluorinated ether ketone being present in a concentration of from about 0.1 to 10 grams per liter. In one aspect of the invention, the polymerization reaction is continued until the reaction mass is substantially transformed into a gel and the reaction is then stopped, and the polytetrafluoroethylene product is recovered in the form of a hydrophilic gel. There is thus provided by the present invention a highly stable hydrogel consisting essentially of hydrophilic polytetrafluoroethylene intimately swollen with water and an effective amount of a perfluorinated ether ketone of the formula: $A - O - (C_3F_{6\cdot n} - CF_2 - Co - CF_3$ wherein A is selected from the group consisting of $CF_3-$, $CF_3-O-CF_2-$, and

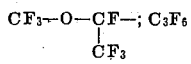

is a perfluoroalkylene group derived from the opening of the double bond of a hexafluoropropylene molecule; and $n$ is 0 or an integer not greater than 5. As indicated heretofore, and as is evident from a consideration of the present disclosure, by the expression "an effective amount" of said perfluorinated ether ketone is meant that there is present in the gel product of the present invention sufficient ketone to achieve the existence of a highly stable hydrogel consisting essentially of hydrophilic polytetrafluoroethylene intimately swollen with water. In another aspect of the invention, the polymerization reaction is continued until the reaction mass has been substantially transformed into a fine, hydrophobic powder. In an alternative embodiment, the fine hydrophobic powder is obtained, after separating the hydrophilic tetrafluoroethylene polymer in the form of a gel, from the reaction mass, by transforming the gel into the fine, hydrophobic powder by and known means therefor. The fine, hydrophobic powder produced by either of the foregoing means is also a part of the present invention.

In particular, we have now found that when the polymerization of tetrafluoroethylene is carried out under usual polymerization conditions, in the presence of an aqueous phase and in the presence of particular chemical compounds having the structure of perfluorinated ether ketones, dissolved or dispersed in the aqueous phase, the polymerization takes place with a high rate, and the polymer produced is of high molecular weight and possesses the surprising characteristics of being in the hydrophilic form, swollen by water and substantially in the gel phase.

The aqueous gel of polytetrafluoroethylene which is formed in the polymerization when carried out in the presence of the perfluorinated ether ketones, is a physical system of a surprisingly high stability, which is resistant to strong stirring treatments and to thermal changes of considerable amplitude; however, with simple physical and chemical methods which will be discussed hereinafter, it is possible to obtain the irreversible separation of the water from the polymer.

The polymer thus separated from the water is in the form of a powder consisting of particles of a fine and homogeneous granulometry. This polymer may be directly utilized, without requiring any grinding or grading treatment, and the manufactured products obtained directly from it by pre-forming and sintering possess excellent physical and mechanical characteristics. Furthermore, the polymer thus obtained shows a considerable tendency to absorb liquid plasticizers, for instance paraffinic hydrocarbons, to give mixes of a homogeneous type. Finally, the polymer thus obtained has a high specific surface, much higher than that shown by polymers obtained by suspension polymerization, even when these latter have been ground to a fine powder.

Under these two aspects, the polymers of this invention have characteristics that recall those typical for the polymers obtained by emulsion polymerization, although they differ fundamentally from these latter owing to their molecular weight, which is very much higher.

BRIEF DESCRIPTION OF THE DRAWING

The single FIGURE of drawings is a graph showing the variation of viscosity with the rate of shear for the polymer produced in Example 1 hereinbelow, in accordance with the present invention, (upper curve) and for the polymer produced by the conventional emulsion polymerization of Example 17, (lower curve).

DESCRIPTION OF THE PREFERRED EMBODIMENTS

Figure 1:
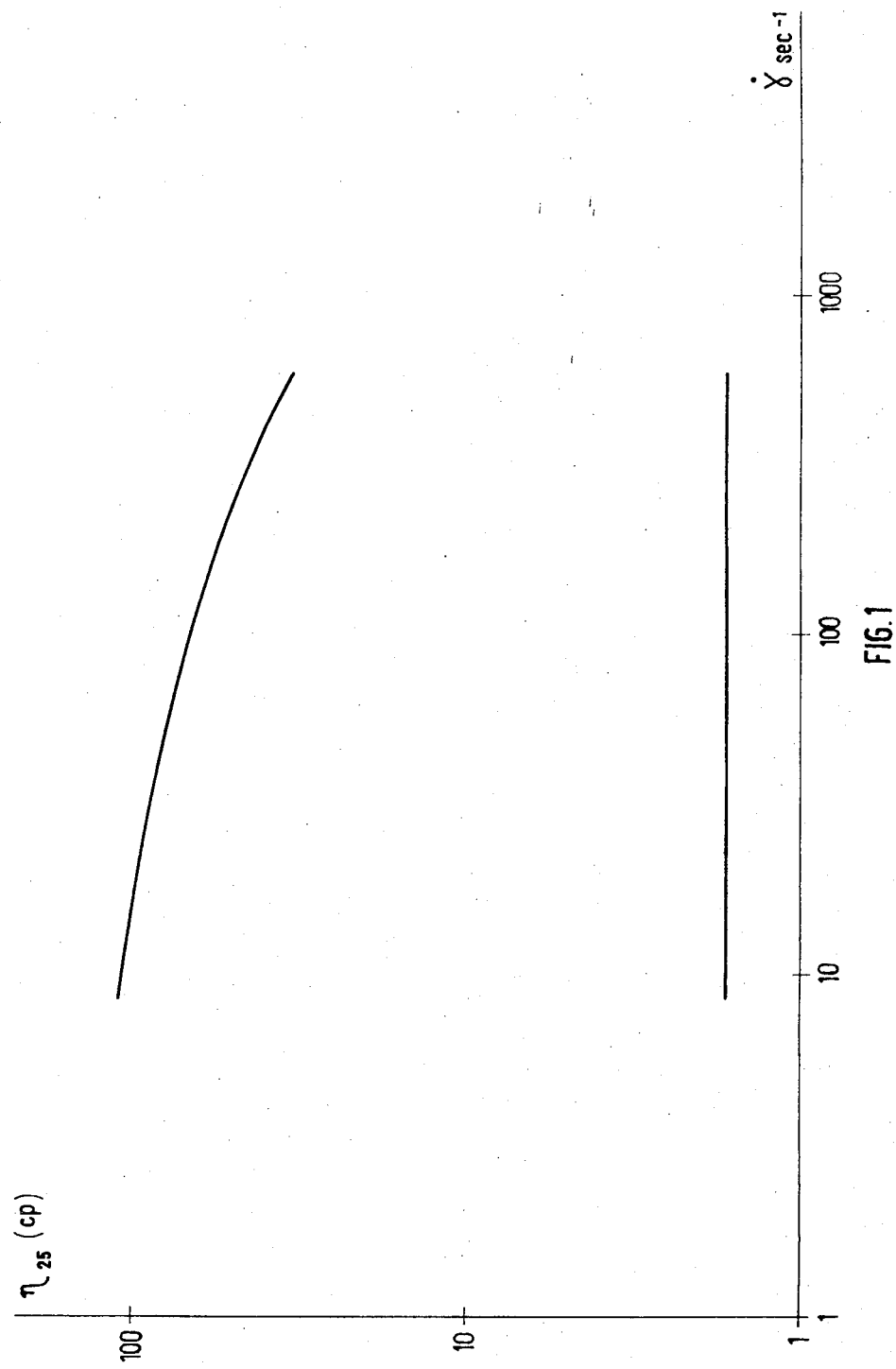

The polymerization process of the present invention is carried out by polymerizing tetrafluoroethylene, under a pressure between 2 and 50 atmospheres, and preferably between 5 and 30 atmospheres, at a temperature between 0°C and 120°C, and preferably between 10°C and 80°C, in the presence of an aqueous phase containing one of the usual polymerization initiators and also containing from 0.1 to 10 g/liter, and preferably from 0.5 to 5 g/l, of at least one perfluorinated ether ketone having the formula:

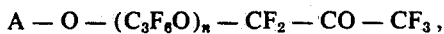

wherein:
A is selected from the group consisting of $-CF_3$, $CF_3-O-CF_2-$, and $CF_3-O-CF(CF_3)-$;

$C_3F_6$ is a perfluoroalkylene unit derived from the opening of the double bond of a hexafluoropropylene molecule, and $n$ is 0 or an integer from 1 to 5.

The polyether ketones may be used along or in admixture with each other.

The perfluorinated ether ketones and the methods for their production have been described in Italian Pat. No. 789,221 (corresponding to U. S. application Ser. No. 651,128, filed on July 5, 1967, and issued May 19, 1970, as U. S. Pat. No. 3,513,203). Since the process of the present invention is carried out in an aqueous phase, the perfluorinated ether ketones are usually present in the reacting system in the form of their corresponding hydrates, thus containing in their molecule one or more molecules of water.

It has been found that these compounds appear to exert in the aqueous phase a specific action whereby, when the tetrafluoroethylene is polymerized in their presence, with the usual polymerization initiators, the formation of the polymer takes place according to a distinctive mechanism which has no correspondence in anything previously known in the field of the polymerization of tetrafluoroethylene. It is postulated that a wetting action, but not emulsifying action, is exerted by the perfluorinated ether ketones in the polymerization of tetrafluoroethylene in aqueous phase, which action seems to be specific to the above defined chemical compounds. As a matter of fact, hexafluoroacetone, which shows structural similarities with the perfluorinated ether ketones of the invention, but which does not contain etheric oxygen atoms, does not exert a similar action.

The polymerization initiators which may be utilized are, as already mentioned, the usual initiators which are used for tetrafluoroethylene polymerization. The choice of a specific type of initiator does not appear to be critical to this invention. However, the initiators which are particularly useful for the process of the present invention include: hydrogen peroxide and ammonium or alkali-metal persulphates, perphosphates, percarbonates, and perborates. These may be employed in concentrations varying from 0.001 to 10 g/l, either along or in combination with activating agents having reducing properties, such as water soluble salts or hydroxides of iron, copper, silver and titanium (such as $FeSO_4$, $AgNO_3$, $TiCl_3$) sodium or potassium sulphites, thiosulphates, disulphites, and metadisulphites, in concentrations varying from 0.0001 to 1 g/l.

As initiators there may also be used organic diacyl peroxides, dialkyl peroxides and peracids, as well as perhalogenated, aliphatic azo-compounds, for example alpha, alpha'-azo-bis-isobutyronitrile. Other effective initiators are the macromolecular perfluorinated polyperoxides described in Italian Pat. No. 748,739 (corresponding to U.S. Ser. No. 562,915 filed on July 5, 1966), or ultra-violet radiations, or high-energy electromagnetic radiations such as X-rays and $\gamma$ rays.

In accordance with what is known in the field of the polymerization of tetrafluoroethylene, buffering agents may also be present in the aqueous phase.

Since the perfluorinated ketones used in carrying out the present invention are very stable in acid medium while they are relatively less stable in alkaline medium, the pH of the aqueous reaction phase is preferably maintained at a value between 1 and 9.

Under the above indicated conditions, the polymerization of tetrafluoroethylene takes place in an aqueous phase containing, dissolved or dispersed therein, at least one perfluorinated ether ketone of the type and in the quantities indicated, usually in the hydrated form. The resulting polymer has unusual characteristics of being hydrophilic, intimately and completely penetrated by and swollen with water, and has the appearance and consistency of a gel.

It has been observed that the physical characteristics of the reaction system vary gradually with degree of progress of the reaction. In a first phase, for instance, when the concentration polymer product does not exceed a few tenths of a gram per liter of water, the swollen polymer occupies substantially the whole volume of the aqueous medium, which appears to form a homogeneous system having a consistency and viscosity definitely greater than that of water. In this first phase of the reaction, the water-polymer system definitely displays characteristics approximating those of a hydrosol.

As the amount (and concentration) of formed polymer increases, a phenomenon gradually takes place involving the separation of the reaction mass into two phases. One of these phases consists essentially of water which contains practically no polymer. The other phase consists essentially of gel particles of finite size having a diameter of about a millimeter, which particles contain a gradually increasing concentration of swollen polymer, because of simultaneous syneresis. These particles may contain, for instance, from about 5 to even more than 50 parts by weight of polymer per 100 parts of water and still retain the typical aspect and consistency of a gel. Their average density, which at the beginning is only slightly greater than that of water, increases with increasing polymer content. The particles of gel may be maintained in uniform distribution in the aqueous phase by gentle stirring, without causing any thickening or agglomerating phenomenon. This physical system possesses a complete stability, in the sense that it is not irreversibly altered by a prolonged and energetic stirring. It flows freely through the pipes and valves and shows no tendency to form adhering layers on the inside walls of the equipment, and thus does not cause occlusions.

As the concentration of polymer increases further, a gradual transformation of the gelatinous polymer into a non-wettable fine power takes place spontaneously.

The solid unwettable polymer appears to be in the form of a powder consisting of particles with a relatively fine granulometry and homogeneous dimensions and of high specific surface, these particles being characterized by good flowability, without any tendency to agglomerate.

It has been ascertained that a polymerization system of this type does not pose any problem for the production of tetrafluoroethylene in a continuous process. That is, there is no problem concerning the continuous discharge of part of the reacting phase from the polymerization reactor. Furthermore, although the course of the polymerizations is very fast, there are no problems concerning the removal of the high heat of reaction by the water. This is due to the hydrophilic nature of the polymer, which is completely swollen by the water.

In accordance with an aspect of the present invention, the polymerization may be interrupted when the polymer is still in the form of a hydrogel. From this hydrogel, the polymer of tetrafluoroethylene may be recovered in the solid state by means of different types of simple processes.

A first such method comprises removing the water from the gel by evaporation or distilling. This may be achieved by simply heating the gel at temperatures which may be slightly higher than room temperature, or at higher temperatures up to 300°C, under atmospheric pressure, optionally in the presence of a stream of gas which facilitates the removal of the water. The water may also be removed from the gel by operating under reduced pressure; in such a case it is possible to operate at temperatures even lower than 0°C, according to techniques commonly used for lyophilization processes.

Other methods which may be used for recovering the solid polymer from the gel include treating the gel itself with strong alkaline agents, as for example an aqueous solution of a base, or concentrated acids, for example sulphuric or phosphoric acid. By the foregoing methods, the gel is irreversibly transformed into a non-hydrophilic solid polymer, which polymer is separated from the water by filtering and dried in the usual manner.

In accordance with one aspect of the process of this invention, the irreversible transformation of the polymer from the swollen hydrophilic form into an unwettable powder is obtained directly in the polymerization reactor. This occurs when the degree of conversion of the monomer under polymerization is gradually increased until a high concentration, generally between about 200 and 250 g of polymer per liter of water, is reached. Under these conditions, the reaction system undergoes a transformation by which practically all the water is removed from the gel phase, leaving the polymer in the form of a finely subdivided and unwettable powder. This aspect of the process makes it possible, therefore, to obtain directly from the polymerization zone polymers of tetrafluoroethylene in the form of fine powders consisting of particles of regular and homogeneous morphological characteristics.

An exact definition of the degree of conversion of the monomer at which the irreversible transformation of the hydrophilic polymer into a fine powder occurs is not possible without defining exactly the variables which may influence the system, such as the type and quantity of perfluorinated ether ketone, the polymerization temperature, etc.

Furthermore, it must be noted that the transformation of the hydrophilic polymer into a powder occurs gradually, there being at the beginning a polymer which, for the greatest part, is in the form of a gel and for only a small part is in the form of a powder, while towards the end of the transformation there is a prevalence of fine powder with small amounts of polymer in the gel state.

Thus, the indication given previously concerning the conversion value at which the transformation takes place must be considered as only approximate and only indicative of a range within which, in general, the transformation takes place.

However, in the practical execution of the process, once the reaction conditions (temperature, type and quantity of perfluorinated ether ketone, etc.) have been established, the concentration at which the transformation occurs may be easily ascertained by examining samples taken from the reaction mass.

It has been found that the irreversible transformation from a hydrophilic swollen polymer into a polymer in the form of a fine unwettable power may also be obtained directly in the course of the polymerization at a lower degree of conversion of the monomer into a polymer when an emulsifying agent of the type commonly used in the polymerization of tetrafluoroethylene in aqueous emulsion is introduced into the reaction system, either at the beginning or during the course of the reaction itself. For this purpose perfluorooctanoic acid or its ammonium salts or alkali metal salts at concentrations between about 0.01 and 5 g/l, and preferably between about 0.02 and 1 g/l, may be used. Under these conditions, the polymer which is obtained from the reaction is already in the form of a fine powder when its concentration attains values of about 100 g of polymer per liter of aqueous phase.

The process of this invention thus provides polymers of tetrafluoroethylene in powder form, either directly from the polymerization reaction, or by simple successive treatments of a hydrogel formed in the polymerization. In whichever way these polymers have been obtained, when they have been separated from the water by filtering and drying, they have properties and behave in subsequent manipulations in considerable contrast with the coarse-grained polymers of an irregular physical shape which are obtained under the usual conditions of the previously known processes for suspension polymerization of tetrafluoroethylene. The polymers prepared in the presence of perfluorinated polyether ketones are in the form of powders having a good flowability, and, by preforming and sintering, manufactured articles of excellent physical and mechanical characteristics may be directly obtained therefrom. Furthermore, they have a high compatibility with plasticizing liquids and, therefore, can be processed according to inexpensive techniques of lubricated extrusion.

The following examples are presented to further illustrate the invention.

EXAMPLE 1.

This experiment was carried out in a 2,500 ml stainless steel autoclave fitted with a thermometer, an anchor stirrer, a heating sleeve and valves for the introduction of liquids and gases, and connected to a pressure gauge and thermometers.

In the closed autoclave there was first produced a vacuum of 0.1 mm Hg; then nitrogen at 1 atm was introduced. These two operations were repeated several times until all traces of oxygen in the autoclave had been eliminated. Finally, a further vacuum was applied. Into the autoclave there were then introduced through a liquid pump 4.4 g of perfluoro-4,7-dioxa-5-methyloctanone-2,

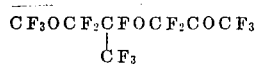

and 0.035 g of ammonium persulphate dissolved in 1350 ml of distilled and previously de-aerated water. Into the autoclave there was then introduced $C_2F_4$ to a pressure of 20 atm. Then, after having brought the temperature of the internal liquid phase to 30°C by means of the external circulation of thermally controlled liquid, 0.040 g of $(NH_4)_2SO_4 \cdot FeSO_4 \cdot 6H_2O$ (Mohr salt) dissolved in 50 ml of $H_2O$ was introduced by means of a feeding pump. The polymerization started immediately and, after 15 minutes, it was interrupted, and the residual monomer was vented off.

From the opened autoclave a mixture of water and polytetrafluoroethylene, forming a homogeneous gelatinous mass, was withdrawn. This mass, subjected for 3 hours to stirring with a blade stirrer running at 600 r.p.m., did not change its aspect and no separation of polymer in an unwettable, powder from occurred.

On a fraction of the gel, viscosity measurements were carried out by using a ROTOVISCO apparatus of the firm Haake and by operating according to W. HEINZ (Kolloid Zeitschrift 145, 119 (1956) at various rates of sheer. The values reported in the following table were obtained.

TABLE 1

| $\gamma°$ sec.$^{-1}$ | $\eta 25$ cp |
|---|---|
| 15 | 100 |
| 30 | 90 |
| 50 | 80 |
| 100 | 66 |
| 300 | 45 |

These data were used for plotting the curve traced on the upper part of the graph of the FIGURE of drawings, on which graph is also recorded the curve for the polymer obtained by emulsion polymerization in Example 17.

From a comparison of the two curves it will be noted that there is a considerable difference in the value of the viscosities and that the conventional type of emulsion shows a viscosity value which is independent from the rate of shear while the gelatinous polymer obtained according to the foregoing Example 1 shows a variation of viscosity which depends on the rate of shear.

In evaluating the difference between the viscosity values, it must be kept in mind that the gel of Example 1 has a polymer content of about 30 g per liter of water, while the polymer emulsion of Example 17 has a polymer content of 216 g per liter of water.

Upon total evaporation of the water contained in it, by heating in an oven at 140°C for 24 hours, the whole polymer prepared as described above yielded 43 g of polytetrafluoroethylene in the form of fine powder.

EXAMPLE 2

Into the autoclave employed in Example 1 were introduced 1,400 ml of de-aerated distilled water, 1.96 g of

0.035 g of ammonium persulphate, 0.040 g of Mohr salt and $C_2F_4$ up to a pressure of 20 atm.

The polymerization was carried out at 30°; as the reaction proceeded, new tetrafluoroethylene was fed into the autoclave so as to maintain the pressure constant at 20 atm.

After 40 minutes of polymerization, the reaction was interrupted and from the opened autoclave a tetrafluoroethylene polymer in the form of an aqueous gel, finely subdivided into wettable particles, was withdrawn. Subjecting this mass to stirring for 3 hours with a blade stirrer running at 600 r.p.m. did not change its aspect and did not give rise to any separation of the polymer in unwettable form.

The above mentioned gel particles were then separated from the excess water by filtering on a porous plate and were then dried in an oven at 140°C for 24 hours. 178 g of a polytetrafluoroethylene in the form of a fine powder were obtained. This powder, subjected to a classification according to ASTM D 1457/62g had the following characteristics:

$d_{50} = 630\mu$;

Apparent density = 182 g/l.

The flowability of the polymer was determined by using an apparatus consisting of a sieve or screen with a mesh opening of 3.5 mm and diameter of 50 mm, subjected to vibrations through a SODER vibrator of the EVS type, running at 50 vibrations per second. On this sieve was placed the fine polymer up to a height of 150 mm. Then the weight of the polymer passing through the sieve in 5 seconds of vibration was determined. The flowability is indicated in g/sec. The flowability of the polymer of the present Example was 5.6 g/sec.

From this powder, by operating according to the above cited ASTM procedure, there were obtained by sintering for 30 minutes at 380°C a number of specimens of polymer having a specific gravity (sp. gr. 23/23°C) of 2.205 and whose characteristics under tensile stress were:

$C_R$ (tensile strength at break) = 235 kg/cm$^2$;

$A_R$ (elongation at break) = 530 percent.

60 g of this polymer powder was placed into a cylindrical vessel together with 40 g of "Risella Oil 117" (a commercial hydrocarbon oil marketed by Shell) and, after 30 minutes of slow rotation of the vessel on its axis, fully absorbed the oil without the appearance of the powder or its flowability being in any way altered.

EXAMPLE 3

Into the autoclave employed in Example 1, following the procedures therein indicated, 1,400 ml of de-aerated distilled water, 1.96 g of

0.035 g of ammonium persulphate, 0.040 g of Mohr salt and $C_2F_4$ up to 20 atm. were introduced. The polymerization was carried out at 30°C, maintaining the pressure in the autoclave constant at 20 atm. by the feeding of additional $C_2F_4$. After 18 minutes, the polymerization was interrupted and the polymer of the tetrafluoroethylene in the form of a water-containing, finely subdivided gel was withdrawn from the autoclave.

There was no separation of unwettable polymer from the reaction mass under stirring with a blade stirrer rotating at 600 r.p.m.

After the separation of the excess water decanting and after drying at 140°C for 24 hours, 187 g of polytetrafluoroethylene in the form of a fine powder were obtained. This powder, analyzed as described in Example 2, had the following characteristics:
 $d_{50} = 700\mu$;
 Apparent density = 176 g/l.
 Flowability = 4.2 g/sec.
Specimens obtained by sintering this powder, according to the procedures indicated in Example 2, showed the following characteristics:
 Sp. gr. = 2.190;
 $C_R = 295$ kg/cm$^2$
 $A_R = 530$ percent.
80 parts of this polymer, treated with 20 parts of "Risella Oil 117" according to the procedure described in Example 2, completely absorbed the oil without either the flowability or the appearance of the polymer appearing to be altered in any way.

EXAMPLE 4

Into the same autoclave as described in Example 1 and following the same procedures therein described, 4.4 g of

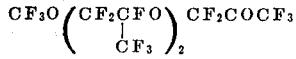

1,400 ml of de-aerated distilled water, 0.035 g of ammonium persulphate, 0.040 g of Mohr salt and $C_2F_4$ up to a pressure of 20 atm. were introduced. The polymerization was carried out at a temperature of 30°C, continuously feeding new $C_2F_4$ during the course of the reaction so as to maintain the pressure constant at 20 atm.

After 35 minutes, the reaction was interrupted and the polymer thus obtained appeared in the form of a water-containing gel, finely subdivided into wet particles. This polymer did not become unwettable even after a prolonged stirring of the aqueous suspension of the gel which had been filtered from the excess water. After drying at 140°C for 24 hours, 145 g of polytetrafluoroethylene in fine particles, showing an apparent density of 164 g/l and a flowability of 4.2 g/sec., were obtained.

Determinations carried out on the sintered polymer, according to the methods indicated in Example 2, gave the following values:
 $C_R = 250$ kg/cm$^2$
 $A_R = 515$ percent.

EXAMPLE 5

Into the same autoclave employed in Example 1, and following the same procedures therein indicated, 2.94 g of

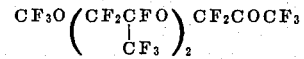

1,400 ml of de-aerated distilled water, 0.035 g of ammonium persulphate, 0.040 g of Mohr salt and $C_2F_4$ up to a pressure of 20 atm. were introduced.

The reaction was interrupted after 10 minutes. The polymer thus obtained appeared in the form of a water-containing gel, finely subdivided into particles which had approximately spherical shape and which were wettable.

After separation of the excess water by filtration and after drying at 140°C for 24 hours, the polymer, weighing 255 g, appeared in particles having an apparent density of 312 g/l and a flowability of 1.69 g/sec.

Specimens obtained by sintering of the thus obtained polymer showed the following characteristics;
 Sp. gr. = 2.175;
 $C_R = 250$ kg/cm$^2$;
 $A_R = 380$ percent.

EXAMPLE 6

The experiment described in Example 5 was repeated, the only difference being that the temperature of the reacting system during the polymerization was maintained constant at 40°C. The polymerization was interrupted after 25 minutes. The polymer thus obtained appeared in the form of a water-containing gel, subdivided into fine, wettable particles.

After separation from the excess water and drying as described in Example 5, 165 g of tetrafluoroethylene polymer in fine particles having an apparent density of 156 g/l, a flowability of 3.2 g/sec., and $d_{50}$ of 460$\mu$ were obtained. Sintered specimens obtained from said polymer, showed the following characteristics:
 Sp. gr. = 2.184
 $C_R = 230$ kg/cm$^2$
 $A_R = 390$ percent.

EXAMPLE 7

Into the same autoclave as employed in Example 1, and following the procedures therein set forth, 2.94 g of

1,400 ml of de-aerated distilled water, 0.035 g of ammonium persulphate, 0.040 g of Mohr salt and $C_2F_4$ up to a pressure of 10 atm. were introduced. The polymerization was carried out at a temperature of 30°C, gradually feeding new $C_2F_4$ so as to maintain the pressure constant at 10 atm. for the entire duration of the polymerization.

After 60 minutes, the polymerization was interrupted. The polymer appeared in the form of a water-containing gel, subdivided into very fine, wettable particles.

After filtering off the excess water and after drying at 140°C for 24 hours, the polymer, weighing 152 g, appeared in the form of fine particles and showed the following characteristics:
$d_{50} = 415\mu$;
Apparent density = 140 g/l
Flowability = 2.4 g/sec.

Specimens obtained by sintering said polymer showed the following characteristics:
Sp. gr. = 2.210;
$C_R = 285$ kg/cm$^2$;
$A_R = 500$ percent.

EXAMPLE 8

Example 4 was repeated, the only difference being that as the wetting agent there were used 4.4 g of a mixture of perfluoro ketones, this mixture having the following composition:
4.0 mol percent of $CF_3OCF_2COCF_3$;
45.5 mol percent of

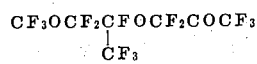

33.8 mol percent of

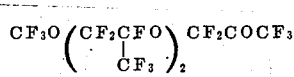

13.8 mol percent of

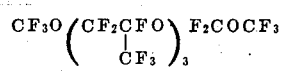

2.0 mol percent of

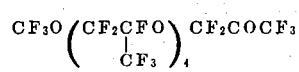

0.9 mol percent of

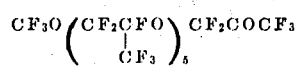

The polymerization was interrupted after 135 minutes. The polymer was obtained in the form of a water-containing gel, finely subdivided into wettable particles. After filtering and drying at 140°C for 24 hours, 216 g of polytetrafluoroethylene were obtained as a fine powder which had the following characteristics:

$d_{50} = 440\mu$;
Apparent density = 183 g/l;
Flowability = 3.8 g/sec.

The determinations on the sintered polymer gave the following values:
Sp. gr. = 2.178;
$C_R = 210$ kg/cm$^2$;
$A_R = 370$ percent

EXAMPLE 9

The preceding example was repeated, the only difference being that 4.9 g of a mixture having the following composition were used as the wetting agent:
14.3 mol percent of

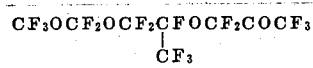

32.6 mol percent of

23.2 mol percent of

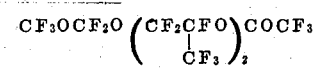

29.9 mol percent of

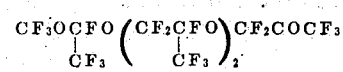

The polymerization was interrupted after 25 minutes; the polymer was in the form of an aqueous gel finely subdivided into wettable particles.

After separating the excess water by filtering and after drying at 140°C for 24 hours, the polymer, weighing 199 g, appeared as a fine powder having the following characteristics:
$d_{50} = 670\mu$;
Apparent density = 196 g/l
Flowability = 3.8 g/sec. Sintered specimens obtained from that polymer showed the following characteristics:
Sp. gr. = 2.205;
$C_R = 250$ kg/cm$^2$;
$A_R = 490$ percent.

EXAMPLE 10

Into the same autoclave as used in Example 1, and following the same procedures as those therein indicated, there were introduced 1.96 g of

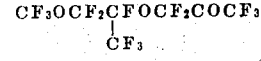

and 1300 ml of de-aerated distilled water.

After increasing the temperature of the liquid phase to 80°C, 0.035 g of ammonium persulphate and 0.040 g of Mohr salt dissolved in 100 ml of de-aerated distilled water and $C_2F_4$ up to a pressure of 20 atm. were introduced into the autoclave. As the reaction proceeded new $C_2F_4$ was fed into the autoclave so as to maintain the pressure constant at 20 atm.

After 20 minutes, the polymerization was interrupted. The polymer thus obtained was in the form of fine particles, substantially dry and hydrophobic. This polymer, after filtering and drying at 140°C for 24 hours, weighed 190 g and showed the following characteristics:

$d_{50} = 970\mu$;
Apparent density = 510 g/l;
Flowability = 5.1 g/sec.

Specimens obtained by sintering said polymer showed the following characteristics:

Sp. gr. = 2.219;
$C_R$ = 200 kg/cm$^2$;
$A_R$ = 350 %.

EXAMPLE 11

Example 3 was repeated, the only difference being that the reaction was conducted for 40 minutes.

When the autoclave was opened the polymer was subdivided into regular particles of spherical shape, unwettable by water. This polymer, after having been dried at 140°C for 24 hours, weighed 347 g. It was characterized according to the methods described in Example 2. The following characteristics were found:

$d_{50} = 960\mu$;
Apparent density = 282 g/l;
Flowability = 6.2 g/sec.

Determinations carried out on the sintered polymer according to the methods described in Example 2 gave the following values:

Sp. gr. = 2.184;
$C_R$ = 250 kg/cm$^2$;
$A_R$ = 385 percent.

EXAMPLE 12

The test described in Example 11 was repeated, the only difference being that the amount of

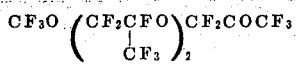

used was 0.98 g. The polymer thus obtained weighed 319 g and had the same characteristics as that described in Example 11.

EXAMPLE 13

This test was carried out in the same reactor and with the same procedures and tests described in Examples 2 to 12, at a temperature of 30°C and at a pressure of 20 atm. of $C_2F_4$. The only difference with respect to the above mentioned tests is that in this test no wetting agent with a perfluoro ether ketone structure was used. After 35 minutes of reaction, there were obtained 325 g of polytetrafluoroethylene in unwettable particles, having an irregular shape and average dimensions of about 5 mm. This polymer, after drying at 140°C for 24 hours, was subjected to grinding and grading in a classifying mill with rotating blades ("Alpine" Type R010/6). The powdery polymer thus obtained showed the following characteristics:

$d_{50} = 445\mu$;
Apparent density = 440 g/l;
Flowability = 2 g/sec.

By sintering this polymer there were obtained specimens showing the following characteristics:

Sp. gr. = 2.156 g/cc;
$C_R$ = 255 kg/cm$^2$
$A_R$ = 320 percent.

EXAMPLE 14

The test of Example 13 was repeated, the only difference being that the reacting system also contained 1.96 g of hexafluoroacetone.

The polymerization was interrupted after 20 minutes and 182 g of polytetrafluoroethylene were obtained in coarse, unwettable particles completely similar to those of EXAMPLE 13.

EXAMPLE 15

Into the same autoclave as that described in the preceding examples and following the same procedures therein indicated, there were introduced 1,400 ml of de-aerated distilled water, 1.960 g of

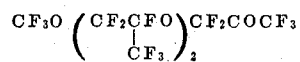

0.700 g of ammonium perfluorooctanoate, 0.935 g of ammonium persulphate, 0.040 g of Mohr salt and $C_2F_4$ up to a pressure of 20 atm.

The polymerization was carried out at a temperature of 30°C, feeding new $C_2F_4$ during the reaction so as to maintain the pressure constant at 20 atm. during the course of the polymerization. After 20 minutes, the polymerization was interrupted and the polymer was extracted from the autoclave in the form of fine, regular particles, unwettable by water.

After drying at 140°C for 24 hours, the polymer thus obtained weighed 358 g and showed the following characteristics:

$d_{50} = 570\mu$;
Apparent density = 444 g/l;
Flowability = 19.4 g/sec.

Sintered specimens of this polymer showed the following characteristics:

Sp. gr. = 2.150;
$C_R$ = 230 kg/cm$^2$;
$A_R$ = 320 percent.

80 g of the powdery polymer, admixed with 20 g of "Risella Oil 117" according to the procedures described in Example 2, absorbed this oil completely without thereby changing the appearance of the powder or its flowability.

EXAMPLE 16

The test of the preceding example was repeated, the only difference being that the quantity of ammonium perfluorooctanoate introduced into the autoclave was 0.087 g. The reaction was interrupted after 15 minutes and the polymer obtained was in the form of fine, regular particles, of a sandy appearance, unwettable by water.

After drying, the polymer weighed 400 g and showed the following characteristics:

$d_{50} = 720\mu$:
Apparent density = 344 g/l;
Flowability = 14.0 g/sec.

Sintered specimens obtained from this polymer showed the following characteristics:

Sp. gr. = 2.147 g/cc;
$C_R$ = 240 kg/cm$^2$;
$A_R$ = 380 percent.

EXAMPLE 17

Example 15 was repeated, the only difference being that no wetting agent of perfluoroetheric-ketone structure was introduced into the reaction medium.

The reaction was interrupted after 75 minutes. The polymer was extracted from the autoclave in the form of an emulsion in water. Examination under an electron microscope showed that this emulsion consisted of polymer particles with diameters ranging from 0.1 to 0.3µ. From this emulsion the polymer may not be separated by filtering. When stirring this emulsion (with a blade stirrer rotating at 600 r.p.m.), the polymer was completely separated from the water after 5 minutes in the form of agglomerates of elementary particles. These agglomerates were unwettable by water.

The polymer thus obtained, dried at 140°C for 24 hours, weighed 303 g. Sintered specimens obtained from this polymer showed the following characteristics:

Sp. gr. = 2.223;
$C_R$ = 190 kg/cm$^2$;
$A_R$ = 480 percent.

On part of the emulsion, viscosity measurements at various rates of shear, as described in Example 1, were carried out before coagulation. The value of µ25 was thereby found to be 1.68 cp, which was independent from the rate of shear.

EXAMPLE 18

Example 2 was repeated, the only difference being that 2.96 g of $CF_3OCF_2COCF_3$ were used as the wetting agent with a perfluoroether-ketone structure.

The polymerization was interrupted after 3 minutes. The polymer extracted from the autoclave was in the form of a finely subdivided, water-containing gel. After separation of the polymer from the excess water by filtering, and after drying at 140°C for 24 hours, there were obtained 71 g of polytetrafluoroethylene in the form of a fine powder, having characteristics similar to those of the polymer of Example 2.

EXAMPLE 19

Into a stainless steel autoclave having an internal volume of 6 liters, fitted with valves for introduction of liquids and gases, and provided with a discharge valve on the bottom and a gamma ray level indicator, 3 of deaerated distilled water, 0.075 g of ammonium persulphate, 0.085 g of Mohr salt, 6.3 g of

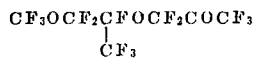

and $C_2F_4$ up to a pressure of 20 atm were introduced, following the procedures described in Example 1.

The polymerization was carried out at a constant temperature of 30°C, while the pressure was maintained at 20 atm. by the continuous introduction of tetrafluoroethylene. After 1 hour, the continuous operation of the process was started by discharging through the bottom valve 3 l/hour of water-polymer mixture which had a concentration of 143g of polytetrafluoroethylene per liter of mixture.

At the same time there were fed into the autoclave through two metering pumps 2,700 l/hr of an aqueous solution containing 0.026 g/l of ammonium persulphate and 2.18 g/l of

and 0.300 l/hr of an aqueous solution containing 0.32 g/l of Mohr salt. In a period of 8 hours there were thus obtained 3,432 g of polytetrafluoroethylene in the form of an aqueous gel of fine wettable particles.

This polymer was then separated from the excess water by decanting and, still by decanting, washed and then subdivided into five portions.

A. A first portion of the polymer was placed into a 3 liter glass flask and was dried under a vacuum of 0.01 mm Hg at a temperature of −5°C, following the known technique of lyophilization. The polymer thus separated from the water had the form of a fine, unwettable powder and had the following characteristics:

$d_{50}$ = 430µ;
Apparent density = 172 g/l;
Flowability = 4.5 g/sec.

From this polymer there were then obtained sintered specimens which had the following characteristics:

Sp. gr. = 2.203;
$C_R$ = 265 kg/cm$^2$;
$A_R$ = 550 percent.

B. A second portion of the polymer was filtered on a porous plate and then dried in an oven at 140°C for 24 hours. The polymer thus obtained was a fine, unwettable powder having characteristics equal to those of the polymer obtained under A.

C. A third portion of the polymer was admixed with an equal volume of water and the mixture was then heated to the boiling point and maintained at the boiling point for 3 hours. The polymer slowly passed from the form of a gel to that of an unwettable polymer. The polymer itself, after being filtered and dried in an oven at 140°C for 24 hours, showed the same characteristics as those of the polymer obtained under procedures A and B.

D. The fourth portion of the polymer was treated with 300 g of a 20 percent solution of NaOH at 80°C, for 90 minutes. After this time, the polymer had become completely hydrophobic. It was then filtered, washed on a filter with water and dried in an oven at 140°C for 24 hours. The polymer was a fine, hydrophobic powder having the same characteristics as those of the polymer obtained under procedures A, B and C.

E. The last portion of said polymer was treated with 300 ml of 96% $H_2SO_4$ for 120 minutes. At the end of this period the polymer had become completely dry and hydrophobic. The polymer was then filtered, washed on the filter with water and finally dried in an oven at 140°C for 24 hours. The polymer was in the form of a fine powder which has the same characteristics as those of the polymer obtained by procedures A–D.

The polymers in the form of unwettable powders, obtained by procedures A, B and C, were analyzed to determine the specific surface by means of a Perkin Elmer - Shell Sorptometer mod. 220. The specific surfaces were found to be:

A. 4.3 m²/g;
B. 4.3 m²/g;
C. 4.2 m²/g.

These values may be compared with the value of 1.1 m²/g found for the polymer obtained in Example 13 (after the described grinding treatment), and with the value of 7.3 m²g found for the polymer obtained according to Example 17.

Samples of some polymers in the form of gels obtained in the preceding examples were subjected to centrifuging at 3200 r.p.m. for 10 minutes in a Martin Christ Osterode centrifuge (Type Uy3φ22cm). On the polymer gel thus separated from the aqueous phase there was determined the quantity of water lost through drying at 140°C for 24 hours, the results being set forth in the following Table 2.

TABLE 2.

| Example number | % of H₂O lost through drying |
| --- | --- |
| 1 | 88.5 |
| 2 | 78.6 |
| 3 | 76.0 |
| 5 | 65.8 |
| 6 | 78.0 |
| 7 | 80.5 |
| 9 | 78.2 |
| 17 | 8 |

Note: The polymer obtained in Example 17 (emulsion polymer) was first coagulated before being subjected to centrifuging.

As can be seen from the above table, the polymers of the present invention, in the form of a gel, even after centrifuging, retain a much greater quantity of water than is retained by the polymer in the emulsion of comparative Example 17. In order to evidence the consistency of the gelatinous polymers of the present invention, samples of polymers in the form of gels obtained in the preceding examples were centrifuged at 2500 r.p.m. for 30 minutes in a Wifug centrifuge.

On each of the polymers thus separated, a penetration test was carried out according to ASTM 1403–62. The results are reported in the following Table 3.

TABLE 3.

| Example No. | Penetration |
| --- | --- |
| 1 | 54 |
| 2 | 41 |
| 3 | 35 |
| 6 | 47 |
| 7 | 41 |
| 9 | 42 |
| 13 | 0 |

Note: The polymer of comparative Example 13 was obtained in suspension and was not, therefore, in the state of a gel.

As can be seen from the above table, the penetration value for the gelatinous polymers is far greater than that of the polymers obtained in suspension, and is comparable to that shown by fatty substances.

Variations can, of course, be made without departing from the spirit and scope of the invention.

Having thus described our invention, what we desire to secure by Letters Patent and hereby claim is:

1. In a process for the aqueous phase polymerization of tetrafluoroethylene to a high molecular weight polymer at a pressure between 2 and 50 atmospheres and at a temperature between about 0°C and 120°C, in the presence of a polymerization initiator for tetrafluoroethylene polymerization, the improvement which comprises carrying out the polymerization reaction in the presence of at least one perfluorinated ether ketone of the formula:

$$A - O - (C_3F_6O)_n - CF_2 - CO - CF_3$$

wherein A is selected from the group consisting of $CF_3-$, $CF_3-O-CF_2-$, and

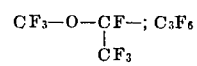

$C_3F_6$ is a perfluoroalkylene group derived from the opening of the double bond of a hexafluoropropylene molecule; and n is zero or an integer not greater than 5; said perfluorinated ether ketone being present in a concentration of from about 0.1 to 10 grams per liter.

2. The process of claim 1 wherein said perfluorinated ether ketone is present in a concentration of from about 0.5 to 5 grams per liter.

3. The process of claim 1 wherein the polymerization reaction is continued until the reaction mass is substantially transformed into a gel and the reaction is then stopped, and the polytetrafluoroethylene product is recovered in the form of a hydrophilic gel.

4. The process of claim 1 wherein the polymerization reaction is continued until the reaction mass has been substantially transformed into a fine, hydrophobic powder.

5. The process of claim 4 where the reaction is carried out in the presence of from about 0.01 to 5 grams per liter of a fluorinated emulsifying agent.

6. The process of claim 5 wherein said emulsifying agent is perfluorooctanoic acid.

7. The process of claim 6 wherein the concentration of said emulsifying agent is between about 0.02 and 1 gram per liter.

8. The process of claim 3 further comprising separating the hydrophilic tetrafluoroethylene polymer in the form of a gel from the reaction mass and transforming it into a fine, hydrophobic powder.

9. The process of claim 1 wherein said polymerization initiator is selected from the group consisting of hydrogen peroxide and the ammonium and alkali metal persulphates, perphosphates, percarbonates and perborates.

10. The process of claim 9 wherein said polymerization initiator is present in a concentration in the range of 0.001 to 10 grams per liter.

11. A highly stable hydrogel consisting essentially of hydrophilic polytetrafluoroethylene intimately swollen with water and an effective amount of a perfluorinated ether ketone of the formula:

$A - O - (C_3F_6O)_n - CF_2 - CO - CF_3$ wherein A is selected from the group consisting of $CF_3-$, $CF_3-O-CF_2-$, and $CF_3-O-CF-; C_3F_6$
            $|$
           $CF_3$ $C_3F_6$ is a perfluoroalkylene group derived from the opening of the double bond of a hexafluoropropylene molecule; and n is zero or an integer not greater than 5.

12. The hydrogel of claim 11 which contains from about 0.23 to about 1.17 weight % of said ketone, based on the weight of said gel.

13. High molecular weight polytetrafluoroethylene in the form of a fine, hydrophobic powder which is compatible with organic plasticizing fluids, obtained by the process of claim 4.

14. High molecular weight polytetrafluoroethylene in the form of a fine, hydrophobic powder which is compatible with organic plasticizing fluids, obtained by the process of claim 8.

* * * * *

PO-1050
(5/69)

UNITED STATES PATENT OFFICE
CERTIFICATE OF CORRECTION

Patent No. 3,721,638                  Dated March 20, 1973

Inventor(s) DARIO SIANESI, GIANCARLO BERNARDI and GIANFRANCO VEROLI

It is certified that error appears in the above-identified patent and that said Letters Patent are hereby corrected as shown below:

Abstract, line 9: "powder to several" should read --powder by several--. Column 1, line 40: "diameter of granule" should read --diameter or granule--. Column 3, line 61: "$(C_3F_6 \cdot n)$" should read --$(C_3F_6O)_n$--. Column 4, line 20: "powder by and" should read --powder by any--. Column 5, line 32: "along" should read --alone--. Column 6, line 5: "along" should read --alone--. Column 7, line 10: "power" should read --powder--. Column 8, line 36: "power" should read --powder--. Column 9, line 45: "from" should read --form--. Column 10, line 47: "1457/62g" should read --1457/62T--. Column 13, line 28: "perfluoro ketones" should read --perfluoro ether ketones--. Column 17, line 55: "indicator, 3 of" should read --indicator, 3 1 of $\frac{1}{2}$--. Column 19, line 12: "7.3 m$^2$g" should read --7.3 m$^2$/g--.
Column 20, line 20: "$CF_3-O-CF-$; $C_3F_6$"
                                         |
                                        $CF_3$                  should read

--$CF_3-O-CF-$;--.
         |
        $CF_3$

Column 21, line 1: "$CF_3-O-CF-$;   $C_3F_6$"
                              |
                             $CF_3$                  should read

--$CF_3-O-CF-$;--.
         |
        $CF_3$

Signed and sealed this 19th day of February 1974

(SEAL)
Attest:

EDWARD M. FLETCHER, JR.               C. MARSHALL DANN
Attesting Officer                     Commissioner of Patents